(12) United States Patent
Weikert

(10) Patent No.: US 8,718,171 B2
(45) Date of Patent: May 6, 2014

(54) METHOD AND DEVICE FOR DETERMINING ESTIMATED VALUES FOR TRANSMITTED SYMBOLS IN A MIMO-OFDM SYSTEM

(75) Inventor: Oomke Weikert, Munich (DE)

(73) Assignee: Rohde & Schwarz GmbH & Co. Kg, Munich (DE)

( * ) Notice: Subject to any disclaimer, the term of this patent is extended or adjusted under 35 U.S.C. 154(b) by 229 days.

(21) Appl. No.: 13/318,871

(22) PCT Filed: Mar. 10, 2010

(86) PCT No.: PCT/EP2010/001485
§ 371 (c)(1),
(2), (4) Date: Nov. 4, 2011

(87) PCT Pub. No.: WO2010/127736
PCT Pub. Date: Nov. 11, 2010

(65) Prior Publication Data
US 2012/0063541 A1    Mar. 15, 2012

(30) Foreign Application Priority Data
May 4, 2009 (DE) .......................... 10 2009 019 894

(51) Int. Cl.
*H04B 7/02* (2006.01)
*H04L 1/02* (2006.01)

(52) U.S. Cl.
USPC ............................ 375/267; 375/259; 375/260

(58) Field of Classification Search
USPC ........................................................ 375/267
See application file for complete search history.

(56) References Cited

U.S. PATENT DOCUMENTS

| 2003/0128658 A1* | 7/2003 | Walton et al. ................. 370/208 |
| 2006/0039312 A1* | 2/2006 | Walton et al. ................. 370/319 |
| 2006/0093060 A1 | 5/2006 | Jung et al. |
| 2008/0063103 A1 | 3/2008 | Lee et al. |

(Continued)

FOREIGN PATENT DOCUMENTS

| EP | 1521386 A2 | 4/2005 |
| WO | WO 2008/010740 A1 | 1/2008 |

OTHER PUBLICATIONS

Hottinen, A. et al., A Randomization Technique for Non-Orthogonal Space-Time Block Codes, 2001, pp. 1479-1482, IEEE.

Ma, X. et al., Performance Analysis for MIMO Systems with Lattice-Reduction Aided Linear Equalization, Feb. 2008, pp. 308-319, vol. 56, IEEE.

(Continued)

*Primary Examiner* — Erin File
(74) *Attorney, Agent, or Firm* — Ditthavong Mori & Steiner, P.C.

(57) ABSTRACT

A method for determining estimated values for data symbols transmitted from at least four transmission antennas of a MIMO transmission system, which are encoded according to the Matrix B transmission mode and weighted with coefficients ($v_i$). The method including determining hypotheses ($\tilde{\vec{s}}_{1-4}, \tilde{\vec{s}}_{5-8}$) for the transmitted data symbols ($\vec{s}_{1-4}, \vec{s}_{5-8}$) from data symbols ($\vec{r}_{1-4}, \vec{r}_{5-8}$) received from at least two reception antennas, weighted with hypotheses ($\tilde{h}_{nm}$) for the transmission factors ($h_{nm}$) associated with a partial transmission channel, between a transmission antenna m and a reception antenna n, and with hypotheses ($\tilde{v}_i$) for the coefficients ($v_i$), determining a metric for each hypothesis ($\tilde{\vec{s}}_{1-4}, \tilde{\vec{s}}_{5-8}$) associated with at least one transmitted data symbol ($\tilde{\vec{s}}_{1-4}, \tilde{\vec{s}}_{5-8}$) and determining the estimated value ($\hat{\vec{s}}_{1-4}, \hat{\vec{s}}_{5-8}$) for the respective, transmitted data symbol ($\vec{s}_{1-4}, \vec{s}_{5-8}$) from the lowest metric associated with each hypothesis ($\tilde{\vec{s}}_{1-4}, \tilde{\vec{s}}_{5-8}$).

20 Claims, 5 Drawing Sheets

| Transmission antenna m | OFDM - transmission timing point | | | |
|---|---|---|---|---|
| | i | i+1 | i+2 | i+3 |
| 1 | $v_1 s_1$ | $-v_2 (s_2)^*$ | $v_3 s_5$ | $-v_4 (s_7)^*$ |
| 2 | $v_1 s_2$ | $v_2 (s_1)^*$ | $v_3 s_6$ | $-v_4 (s_8)^*$ |
| 3 | $v_1 s_3$ | $-v_2 (s_4)^*$ | $v_3 s_7$ | $v_4 (s_5)^*$ |
| 4 | $v_1 s_4$ | $v_2 (s_3)^*$ | $v_3 s_8$ | $v_4 (s_6)^*$ |

(56) References Cited

U.S. PATENT DOCUMENTS

| | | |
|---|---|---|
| 2008/0080632 A1 | 4/2008 | Kim et al. |
| 2009/0046800 A1* | 2/2009 | Xu et al. .................... 375/267 |
| 2009/0268787 A1* | 10/2009 | Cairns et al. ................ 375/148 |
| 2010/0027697 A1* | 2/2010 | Malladi et al. ............... 375/260 |

OTHER PUBLICATIONS

Part 16: Air Interface for Fixed and Mobile Broadband Wireless Access Systems, Feb. 28, 2006, pp. 570-615, IEEE, New York, NY, USA.

Rupp, M., On Extended Alamouti Schemes for Space-Time Coding, 2002, pp. 115-119, IEEE.

* cited by examiner

| | OFDM - transmission timing point | | | |
|---|---|---|---|---|
| Transmission antenna m | l | l+1 | l+2 | l+3 |
| 1 | $s_1$ | $-(s_2)^*$ | $s_5$ | $-(s_7)^*$ |
| 2 | $s_2$ | $(s_1)^*$ | $s_6$ | $-(s_8)^*$ |
| 3 | $s_3$ | $-(s_4)^*$ | $s_7$ | $(s_5)^*$ |
| 4 | $s_4$ | $(s_3)^*$ | $s_8$ | $(s_6)^*$ |

Fig. 1

| | OFDM - transmission timing point | | | |
|---|---|---|---|---|
| Transmission antenna m | l | l+1 | l+2 | l+3 |
| 1 | $v_1 s_1$ | $-v_2 (s_2)^*$ | $v_3 s_5$ | $-v_4 (s_7)^*$ |
| 2 | $v_1 s_2$ | $v_2 (s_1)^*$ | $v_3 s_6$ | $-v_4 (s_8)^*$ |
| 3 | $v_1 s_3$ | $-v_2 (s_4)^*$ | $v_3 s_7$ | $v_4 (s_5)^*$ |
| 4 | $v_1 s_4$ | $v_2 (s_3)^*$ | $v_3 s_8$ | $v_4 (s_6)^*$ |

Fig. 2

| Hypothesis-combination number | Hypotheses | | | | | | Estimated transmission symbols | | | | | | | |
|---|---|---|---|---|---|---|---|---|---|---|---|---|---|---|
| | $\tilde{v}_1 \cdot v_1$ bzw. $\tilde{v}_3 \cdot v_3$ | $\tilde{v}_2 \cdot v_2$ bzw. $\tilde{v}_4 \cdot v_4$ | $\tilde{h}_{n1}/h_{n1}$ | $\tilde{h}_{n2}/h_{n2}$ | $\tilde{h}_{n3}/h_{n3}$ | $\tilde{h}_{n4}/h_{n4}$ | $\tilde{s}_1$ | $\tilde{s}_2$ | $\tilde{s}_3$ | $\tilde{s}_4$ | $\tilde{s}_5$ | $\tilde{s}_6$ | $\tilde{s}_7$ | $\tilde{s}_8$ |
| 1./2. | +1 | +1/-1 | 1 | 1 | 1 | 1 | $s_1$ | $s_2$ | $s_3$ | $s_4$ | $s_5$ | $s_6$ | $s_7$ | $s_8$ |
| 3./4. | +1 | +1/-1 | 1 | 1 | 1 | -1 | | | | | | | | |
| 5./6. | +1 | +1/-1 | 1 | 1 | -1 | 1 | | | | | | | | |
| 7./8. | +1 | +1/-1 | 1 | -1 | 1 | 1 | $s_1$ | $s_2$ | $-s_3$ | $-s_4$ | $s_5$ | $s_6$ | $s_7$ | $-s_8$ |
| 9./10. | +1 | +1/-1 | 1 | 1 | 1 | 1 | $s_1$ | $-s_2$ | $s_3$ | $-s_4$ | $s_5$ | $-s_6$ | $s_7$ | $-s_8$ |
| 11./12. | +1 | +1/-1 | 1 | 1 | 1 | 1 | $s_1$ | $-s_2$ | $s_3$ | $s_4$ | $s_5$ | $-s_6$ | $s_7$ | $s_8$ |
| 13./14. | +1 | +1/-1 | 1 | -1 | -1 | 1 | | | | | | | | |
| 15./16. | +1 | +1/-1 | 1 | 1 | -1 | 1 | | | | | | | | |
| 17./18. | +1 | +1/-1 | -1 | 1 | 1 | 1 | $-s_1$ | $s_2$ | $-s_3$ | $-s_4$ | $-s_5$ | $s_6$ | $s_7$ | $-s_8$ |
| 19./20. | +1 | +1/-1 | -1 | 1 | 1 | 1 | $-s_1$ | $s_2$ | $s_3$ | $s_4$ | $-s_5$ | $s_6$ | $-s_7$ | $s_8$ |
| 21./22. | +1 | +1/-1 | -1 | 1 | 1 | 1 | $-s_1$ | $-s_2$ | $-s_3$ | $s_4$ | $-s_5$ | $-s_6$ | $s_7$ | $s_8$ |
| 23./24. | +1 | +1/-1 | -1 | -1 | 1 | 1 | | | | | | | | |
| 25./26. | +1 | +1/-1 | -1 | 1 | -1 | 1 | | | | | | | | |
| 27./28. | +1 | +1/-1 | -1 | -1 | -1 | 1 | | | | | | | | |
| 29./30. | +1 | +1/-1 | -1 | -1 | 1 | -1 | | | | | | | | |
| 31./32. | +1 | +1/-1 | -1 | -1 | -1 | -1 | $-s_1$ | $-s_2$ | $-s_3$ | $-s_4$ | $-s_5$ | $-s_6$ | $-s_7$ | $-s_8$ |

Fig. 5

| $\tilde{v}_1$ bzw. $\tilde{v}_3$ | $\tilde{v}_2$ bzw. $\tilde{v}_4$ | $\tilde{h}_{n1}$ | $\tilde{h}_{n2}$ | $\tilde{h}_{n3}$ | $\tilde{h}_{n4}$ |
|---|---|---|---|---|---|
| +1 | +1 | $=+\hat{h}_{n1}$ | $=+\hat{h}_{n2}$ | $=+\hat{h}_{n3}$ | $=+\hat{h}_{n4}$ |
| +1 | -1 | $=+\hat{h}_{n1}$ | $=+\hat{h}_{n2}$ | $=+\hat{h}_{n3}$ | $=+\hat{h}_{n4}$ |
| +1 | +1 | $=-\hat{h}_{n1}$ | $=+\hat{h}_{n2}$ | $=+\hat{h}_{n3}$ | $=+\hat{h}_{n4}$ |
| +1 | -1 | $=-\hat{h}_{n1}$ | $=+\hat{h}_{n2}$ | $=+\hat{h}_{n3}$ | $=+\hat{h}_{n4}$ |
| +1 | +1 | $=+\hat{h}_{n1}$ | $=-\hat{h}_{n2}$ | $=+\hat{h}_{n3}$ | $=+\hat{h}_{n4}$ |
| +1 | -1 | $=+\hat{h}_{n1}$ | $=-\hat{h}_{n2}$ | $=+\hat{h}_{n3}$ | $=+\hat{h}_{n4}$ |
| +1 | +1 | $=+\hat{h}_{n1}$ | $=+\hat{h}_{n2}$ | $=-\hat{h}_{n3}$ | $=+\hat{h}_{n4}$ |
| +1 | -1 | $=+\hat{h}_{n1}$ | $=+\hat{h}_{n2}$ | $=-\hat{h}_{n3}$ | $=+\hat{h}_{n4}$ |
| +1 | +1 | $=+\hat{h}_{n1}$ | $=+\hat{h}_{n2}$ | $=+\hat{h}_{n3}$ | $=-\hat{h}_{n4}$ |
| +1 | -1 | $=+\hat{h}_{n1}$ | $=+\hat{h}_{n2}$ | $=+\hat{h}_{n3}$ | $=-\hat{h}_{n4}$ |

METHOD AND DEVICE FOR DETERMINING ESTIMATED VALUES FOR TRANSMITTED SYMBOLS IN A MIMO-OFDM SYSTEM

CROSS-REFERENCE TO RELATED APPLICATION

The present application is a national phase application of PCT Application No. PCT/EP2010/001485, filed on Mar. 10, 2010, and claims priority to German Application No. DE 10 2009 019 894.6, filed on May 4, 2009, the entire contents of which are herein incorporated by reference.

BACKGROUND OF THE INVENTION

1. Field of the Invention

The invention relates to a method and a device for determining estimated values for transmission symbols within a MIMO-OFDM system.

2. Discussion of the Background

In mobile transmission technology with high transmission rates and with low-to-medium mobility of the terminal equipment, multiple antenna systems (Multiple-Input-Multiple-Output (MIMO)-systems) with multiple access according to the orthogonal-frequency multiplex (Orthogonal-Frequency-Division-Multiplexing (FDM)) are increasingly used. The mobile WIMAX standard IEEE802.16e represents an important standard for MIMO-OFDM systems of this kind.

Regarding the technical background, reference is made to US 2008/0063103 A1, which discloses a method for the correction of Alamonti coded MIMO-OFDM signals.

In particular with transmission systems with four transmission antennas, the "Matrix B" transmission mode has proved successful for test purposes, because only two reception antennas are required. Distribution or coding of the individual data symbols $s_1,s_2,s_3,s_4, \ldots$ to be transmitted to the four transmission antennas m=1,2,3,4 at each of four successive OFDM symbol timing points $l,l+1,l+2,l+3$ according to the "Matrix B" transmission mode is illustrated in the table in FIG. 1. As shown in the table in FIG. 2, in order to achieve an additional channel coding ("sub-carrier randomising") in the "Matrix B" transmission mode, a weighting of the data symbols $s_1,s_2,s_3,s_4, \ldots$ to be transmitted, on each of the four transmission antennas m=1,2,3,4, is implemented additionally, at each of four successive OFDM symbol timing points $l,l+1,l+2,l+3$ with coefficients $v_1,v_2,v_3,v_4$ which can each adopt the values +1 or −1.

In order to estimate the transmitted data symbols within the framework of the decoding of the reception symbols, on the one hand, the coefficients $v_1,v_2,v_3,v_4$ and, on the other hand, the channel-transmission factors of the transmission channels between each transmission antenna and each reception antenna, must be estimated. The estimation of the channel transmission factors is typically implemented on the basis of pilot symbols. For this purpose, either standardized pilot symbols known to the receiver or arbitrary pilot symbols not known to the receiver are used. With a use of arbitrary pilot symbols, the individual channel transmission factors can in fact be correctly estimated in their modulus using currently available "Matrix B" decoding methods. However, with currently available "Matrix B" decoding methods, the individual transmission factors provide an uncertainty of 180° in their phase. Since the individual channel transmission factors and also the individual coefficients for channel coding cannot be accurately determined with regard to their sign using the currently available decoding method, the transmitted data symbols also cannot be determined accurately.

SUMMARY OF THE INVENTION

Embodiments of the invention provide a decoding method for a MIMO system with four transmission antennas and with "Matrix B" transmission mode.

Embodiments of the invention provide a method for determining estimated values for data symbols transmitted from each of at least four transmission antennas of a MIMO-OFDM transmission system and by an associated device.

According to the invention, in the case of a MIMO-OFDM transmission system with "Matrix B" coding and additional weighting of the transmission symbols transmitted by each transmission antenna with coefficients, hypotheses are set up for the data symbols transmitted from each of the preferably four transmission antennas, in that the data symbols received from each of the at least two reception antennas, preferably from the precisely two reception antennas, are weighted with possible hypotheses for the channel transmission factors of the transmission channels between the respective transmission antenna and the respective reception antenna and with hypotheses for the coefficients. For each hypothesis set up in this manner for each transmitted data symbol, a metric is set up, and the estimated value for each data symbol transmitted is determined from the hypothesis for the respectively transmitted data symbol which provides the lowest metric.

In one variant, each metric is determined separately for each data symbol transmitted respectively by one transmission antenna at one OFDM symbol timing point. In this context, for every hypothesis determined for each transmitted data symbol, the Euclidian distance from the data symbol of the symbol alphabet disposed nearest in the constellation diagram is calculated. In the case of a "Matrix B" coding, in which, for reasons of redundancy, two of the four transmission antennas respectively are supplied with identical data symbols to be transmitted, only the estimated values of the data symbols transmitted respectively by every second transmission antenna therefore need to be calculated with a metric calculation of this kind. Accordingly, in an advantageous manner, only half the number of hypotheses for the channel transmission factors and half the number of metrics need to be calculated.

In a second variant, each metric is determined via the data symbols transmitted from all of the preferably four transmission antennas at one OFDM symbol timing point. In this context, the Euclidian distance from the data symbols of the symbol alphabet disposed respectively nearest in the constellation diagram is calculated for one hypothesis for the data symbols transmitted respectively by all four transmission antennas. In the second variant, the calculation cost is higher than with the first variant. However, the decoding in the second variant is more robust than in the first variant because of the redundancy.

The positive and the negative value of the transmission factor determinable correctly in each case with regard to the modulus, but not unambiguously determinable only with regard to its sign should be used as hypotheses for the transmission factors associated with each of the individual transmission channels. Since the transmission factors of the transmission channels which are emitted from a common transmission antenna are not determinable with regard to their sign for the same reason, but are identical and can be determined in advance with regard to their modulus, only hypotheses for four transmission factors need to be determined independently of the number of reception antennas.

The values +1 or −1 should be used as hypotheses for the coefficients for the additional channel coding, wherein either only the value +1 or only the value −1 should be set for the coefficients for weighting the data symbols transmitted at every second OFDM symbol timing point.

Accordingly, in a first embodiment of the method according to the invention, a total of 32 hypothesis combinations for which the associated metrics must be determined is obtained. Since, from this total of 32 hypothesis combinations, only 8 hypothesis combinations lead to data symbols in the constellation diagram which are associated with the symbol alphabet used, and since the sign for the estimated values of the data symbols transmitted respectively by the four transmission antennas is not relevant in the case of an amplitude-orientated analysis of the transmission symbols, for example, in the case of a measurement of the amplitude of the error vector (Error Vector Magnitude (EVM)) or of the IQ offset, only one of these 8 hypothesis combinations, which are associated with data symbols of the symbol alphabet needs to be detected in determining the estimated values for the data symbols transmitted by each of the four transmission antennas.

In a second embodiment of the method according to the invention, in order to reduce the number of the total of 32 hypothesis combinations to be determined to a total of 10 hypothesis combinations to be calculated, in addition to limiting the hypotheses for the coefficients for the weighting of the data symbols transmitted respectively at every second OFDM symbol timing point exclusively to the value +1 or exclusively to the value −1, either only positive values of the transmission factor correctly determinable in each case with regard to the modulus should be used for the hypotheses of the transmission factors associated with the individual transmission channels, or a negative value of the transmission factor correctly determinable in each case with regard to the modulus should be used only for a single transmission factor associated with a transmission channel. From the total of 10 hypothesis combinations to be determined in this case, at least one hypothesis combination leads to data symbols in the constellation diagram which are associated with the symbol alphabet used. On the basis of a purely amplitude-orientated analysis of the transmission symbols, only one of these hypothesis combinations which lead to data symbols in the constellation diagram associated with the symbol alphabet used needs to be detected.

The channel transmission factors in the individual sub-carriers and at the individual OFDM symbol timing points of a partial transmission channel are identical, assuming a flat-frequency and time-invariant partial transmission channel, so that, a hypothesis calculation and metric calculation for all possible hypotheses needs to be implemented only for one sub-carrier and for one OFDM symbol timing point of the respective partial transmission channel, typically for the first sub-carrier and for the first OFDM symbol timing point of the respective partial transmission channel, and these results must be transferred to the other sub-carriers and the other OFDM symbol timing points of the respective partial transmission channel.

BRIEF DESCRIPTION OF THE DRAWINGS

Embodiments of the method according to the invention and of the device according to the invention for determining estimated values for data symbols transmitted in each case from four transmission antennas of a MIMO-OFDM transmission system are explained in detail in the following section with reference to the drawings. The drawings are as follows:

FIG. 1 shows a table for Matrix B coding of data symbols transmitted in each case by four transmission antennas within a MIMO-OFDM transmission system;

FIG. 2 shows a table for the additional channel coding in the case of a Matrix B coding within a MIMO-OFDM transmission system;

FIG. 5 shows a table with 32 hypothesis combinations of a first exemplary embodiment of the estimation according to the invention of transmission symbols;

FIG. 6 shows a table with 10 hypothesis combinations of a second exemplary embodiment of the estimation according to the invention of transmission symbols.

DETAILED DESCRIPTION OF EXEMPLARY
EMBODIMENTS OF THE INVENTION

The following section discusses the mathematical basis required for an understanding of the invention.

Figure 3:
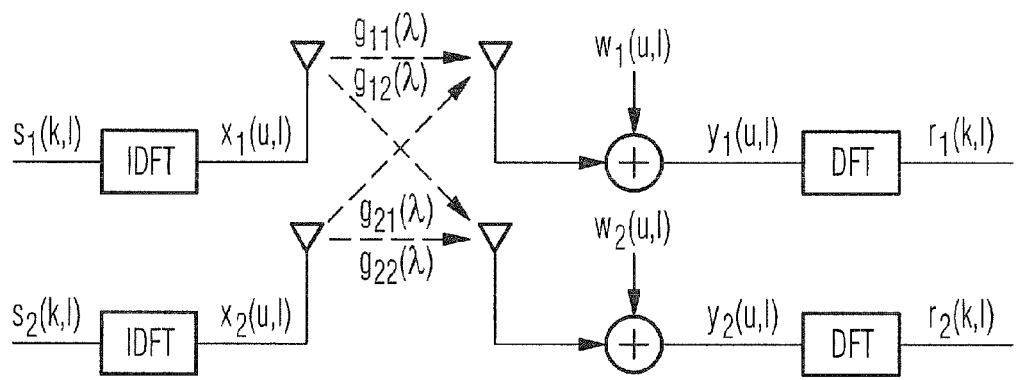
FIG. 3 shows a block-circuit diagram of a MIMO-OFDM transmission system with two transmission antennas and two reception antennas in the time domain.

According the block-circuit diagram in FIG. 3, in which a MIMO-OFDM transmission system with two transmission antennas and two reception antennas is illustrated, an OFDM data symbol $s_m(k,l)$ is transmitted in the sub-frequency carrier k and at the OFDM symbol timing point l on each transmission antenna m. By means of inverse discrete Fourier transform (IDFT), the OFDM data symbols $s_m(k,l)$ to be transmitted are transformed from the frequency domain into the time domain and produce the corresponding OFDM data symbol $x_m(u,l)$ there. The transformation index u in the time domain corresponds to the transformation index k in the frequency domain of the IDFT. The OFDM data symbol $s_m(k,l)$ transmitted by the transmission antenna m is transmitted via the transmission channel with the transmission factor $g_{nm}(\lambda)$ to the reception antenna n. The value $\lambda$ in this context denotes the coefficient of the impulse response between the transmission antenna m and the reception antenna n. A frequency-selective and time invariant transmission channel is assumed here.

A superimposition of the OFDM data symbols $x_m(u,l)$ transmitted respectively by all transmission antennas m and an additional additive noise interference $w_n(u,l)$ on the basis of the noise in analog components of the reception antenna n occurs in the reception antenna n. The received OFDM data symbol $y_n(u,l)$ in the time domain resulting from the superimposition in the reception antenna n is transformed by means of discrete Fourier transform (DFT) into the receiving data symbol $r_n(u,l)$ in the frequency domain.

For the MIMO-OFDM transmission system illustrated in FIG. 3 with two transmission antennas and two reception antennas, the mathematical relationships for the receiving OFDM data symbols $y_n(u,l)$ illustrated in equation (1) are obtained.

$$y_1(u, l) = \sum_\lambda g_{11}(\lambda) \cdot x_1(u-\lambda, l) + \sum_\lambda g_{12}(\lambda) \cdot x_2(u-\lambda, l) + w_1(u, l) \quad (1)$$

$$y_2(u, l) = \sum_\lambda g_{21}(\lambda) \cdot x_1(u-\lambda, l) + \sum_\lambda g_{22}(\lambda) \cdot x_2(u-\lambda, l) + w_2(u, l)$$

Figure 4:
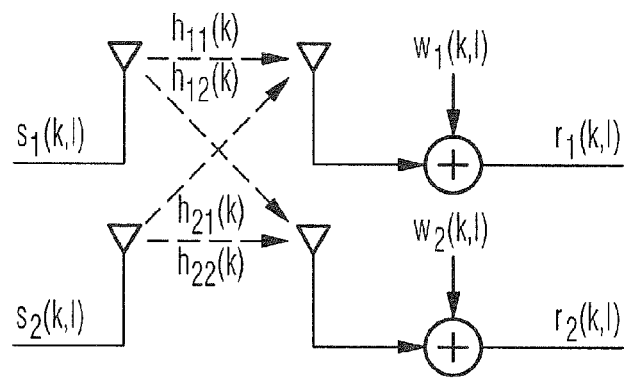
FIG. 4 A block-circuit diagram of a MIMO-OFDM transmission system with two transmission antennas and two reception antennas in the frequency domain.

A MIMO-OFDM transmission system, which is equivalent to the MIMO-OFDM transmission system in FIG. 3 and provides only frequency-domain values, is presented in FIG. 4. The transmission factors $h_{nm}(k)$ in the sub-frequency carrier k between the transmission antenna m and the reception antenna n are obtained through discrete Fourier transform from the corresponding transmission factors $g_{nm}(\lambda)$ in the time domain. By analogy, the noise values $w_n(k,l)$ in the frequency domain are obtained through discrete Fourier transform from the corresponding noise values $w_n(u,l)$ in the time domain.

For the MIMO-OFDM transmission system illustrated in FIG. 4 with two transmission antennas and two reception antennas, the mathematical relationships for the received OFDM data symbols $r_n(u,l)$ presented in equation (2) are obtained.

$$r_1(k,l) = \sum_k h_{11}(k) \cdot s_1(k,l) + \sum_k h_{12}(k) \cdot s_2(k,l) + w_1(k,l) \quad (2)$$

$$r_2(k,l) = \sum_k h_{21}(k) \cdot s_1(k,l) + \sum_k h_{22}(k) \cdot s_2(k,l) + w_2(k,l)$$

Starting from equation (2), with a "Matrix B" coding according to the table in FIG. 1 and an additional channel coding according to the table in FIG. 2, the mathematical relationship in equation (3A) or respectively in the abbreviated version in equation (3B) is obtained for an OFDM data symbol $r_n(l)$ at the OFDM symbol timing point l received by the reception antenna n and for an OFDM data symbol $r_n^*(l+1)$ at the symbol timing point l+1 received by the reception antenna n, and the mathematical relationship in equation (4A) or respectively in the abbreviated version in equation (4B) is obtained for an OFDM data symbol $r_n(l+2)$ at the OFDM symbol timing point l+2 received by the reception antenna n and for an OFDM data symbol $r_n^*(l+3)$ at the OFDM symbol timing point l+3 received by the reception antenna n.

$$\begin{pmatrix} r_n(l) \\ r_n^*(l+1) \end{pmatrix} = \begin{pmatrix} v_1 & 0 \\ 0 & v_2 \end{pmatrix} \cdot \begin{pmatrix} h_{n1} & h_{n2} & h_{n3} & h_{n4} \\ h_{n2}^* & -h_{n1}^* & h_{n4}^* & -h_{n3}^* \end{pmatrix} \begin{pmatrix} s_1 \\ s_2 \\ s_3 \\ s_4 \end{pmatrix} \quad (3A)$$

$$\vec{r}_{n,1-4} = V \cdot H_{n,1-4} \cdot \vec{s}_{1-4} \quad (3B)$$

$$\begin{pmatrix} r_n(l+2) \\ r_n^*(l+3) \end{pmatrix} = \begin{pmatrix} v_3 & 0 \\ 0 & v_4 \end{pmatrix} \cdot \begin{pmatrix} h_{n1} & h_{n2} & h_{n3} & h_{n4} \\ h_{n3}^* & h_{n4}^* & -h_{n1}^* & -h_{n2}^* \end{pmatrix} \begin{pmatrix} s_5 \\ s_6 \\ s_7 \\ s_8 \end{pmatrix} \quad (4A)$$

$$\vec{r}_{n,5-8} = V \cdot H_{n,5-8} \cdot \vec{s}_{5-8} \quad (4B)$$

In equations (3A) and (3B) and respectively (4A) and (4B), the abbreviation $h_{nm}$ for the transmission factor $h_{nm}(k)$ in equation (2) has been introduced, and the conjugated complex coefficient $v_i^*$ has been replaced by the coefficient $v_i$ in view of the fact that it is real.

As is evident from equations (3A) and (3B) and respectively (4A) and (4B), in order to determine the 4 OFDM data symbols $\vec{s}_{1-4}$ and respectively $\vec{s}_{5-8}$ transmitted with known transmission factors $h_{nm}$ and with known coefficients $v_i$, at least two reception antennas 1,2 are required. According to equation (5A) and (5B) and respectively equation (6A) and (6B), the OFDM data symbols $\vec{r}_{1-4}$ and respectively $\vec{r}_{5-8}$ received by the two reception antennas 1,2 at the OFDM symbol timing points l and l+1 and l+2 and l+3 are obtained.

$$\begin{pmatrix} r_1(l) \\ r_1^*(l+1) \\ r_2(l) \\ r_2^*(l+1) \end{pmatrix} = \begin{pmatrix} v_1 & 0 & 0 & 0 \\ 0 & v_2 & 0 & 0 \\ 0 & 0 & v_1 & 0 \\ 0 & 0 & 0 & v_2 \end{pmatrix} \cdot \begin{pmatrix} H_{1,1-4} \\ H_{2,1-4} \end{pmatrix} \cdot \begin{pmatrix} s_1 \\ s_2 \\ s_3 \\ s_4 \end{pmatrix} \quad (5A)$$

$$\vec{r}_{1-4} = V_{12} \cdot H_{1-4} \cdot \vec{s}_{1-4} \quad (5B)$$

$$\begin{pmatrix} r_1(l+2) \\ r_1^*(l+3) \\ r_2(l+2) \\ r_2^*(l+3) \end{pmatrix} = \begin{pmatrix} v_3 & 0 & 0 & 0 \\ 0 & v_4 & 0 & 0 \\ 0 & 0 & v_3 & 0 \\ 0 & 0 & 0 & v_4 \end{pmatrix} \cdot \begin{pmatrix} H_{1,5-8} \\ H_{2,5-8} \end{pmatrix} \cdot \begin{pmatrix} s_5 \\ s_6 \\ s_7 \\ s_8 \end{pmatrix} \quad (6A)$$

$$\vec{r}_{5-8} = V_{34} \cdot H_{5-8} \cdot \vec{s}_{5-8} \quad (6B)$$

To determine the matrix elements of the channel matrices $H_{1-4}$ and respectively $H_{5-8}$, in equation (5B) and respectively (6B), an estimation matrix $\vec{H}$ with estimated transmission factors $\hat{h}_{nm}$ is required. For a MIMO-OFDM transmission system with respectively four transmission antennas and four reception antennas, an estimation matrix $\vec{H}$ of this kind is obtained according to equation (7)

$$\vec{H} = \begin{pmatrix} \hat{h}_{11} & \hat{h}_{12} & \hat{h}_{13} & \hat{h}_{14} \\ \hat{h}_{21} & \hat{h}_{22} & \hat{h}_{23} & \hat{h}_{24} \\ \hat{h}_{31} & \hat{h}_{32} & \hat{h}_{33} & \hat{h}_{34} \\ \hat{h}_{41} & \hat{h}_{42} & \hat{h}_{43} & \hat{h}_{44} \end{pmatrix} \quad (7)$$

The determination of the estimated values $\hat{h}_{nm}$ for the individual transmission factors $h_{nm}$ is implemented on the basis of pilot symbols. If the pilot symbols used are standardized, then they are known to the receiver and, from the transmitted pilot symbol known to it, and the received pilot symbol corresponding to the known transmitted pilot symbol, the receiver can correctly determine the estimated value $\hat{h}_{nm}$ for the associated transmission factor $h_{nm}$ with regard to modulus and sign.

If arbitrary, non-standardized pilot symbols are used, preferably BPSK-modulated pilot symbols, the modulus of the estimated value $\hat{h}_{nm}$ for the associated transmission factor $h_{nm}$ can indeed be determined by the receiver, but, because the receiver does not know whether a BPSK modulated pilot symbol +1 or a BPSK-modulated pilot symbol −1 has been transmitted, uncertainty exists regarding the sign or the phase of the estimated value $\hat{h}_{nm}$ for the associated transmission factor $h_{nm}$. This uncertainty about the sign of the estimated value $\hat{h}_{nm}$ for the associated transmission factor $h_{nm}$ is identical for all transmission factors $h_{nm}$ which relate to the same transmission antenna, because of the pilot symbol transmitted identically from the same transmission antenna to all reception antennas. Accordingly, the estimated values $\hat{h}_{nm}$ for the transmission factors $h_{nm}$ of one column of the estimation matrix $\vec{H}$ provide the same sign and differ only in their respective moduli. In the individual sub-frequency carriers of the transmission channel from a transmission antenna to a reception antenna, the estimated value $\hat{h}_{nm}$ for the associated transmission factor $h_{nm}$ is identical with regard to sign and modulus because of the flat-frequency partial channels.

In the case of unknown coefficients $v_1, v_2, v_3, v_4$, hypotheses $\tilde{v}_1, \tilde{v}_2, \tilde{v}_3, \tilde{v}_4$ for the unknown coefficients $v_1, v_2, v_3, v_4$ are set up. With these hypotheses $\tilde{v}_1, \tilde{v}_2, \tilde{v}_3, \tilde{v}_4$ for the unknown coefficients $v_1, v_2, v_3, v_4$, the received OFDM data symbols $\vec{r}_{1-4}$ and respectively $\vec{r}_{5-8}$ are weighted according to equations (8A) and (8B) and respectively equation (9A) and (9B).

$$\begin{pmatrix} \tilde{r}_1(l) \\ \tilde{r}_1^*(l+1) \\ \tilde{r}_2(l) \\ \tilde{r}_2^*(l+1) \end{pmatrix} = \begin{pmatrix} \tilde{v}_1 & 0 & 0 & 0 \\ 0 & \tilde{v}_2 & 0 & 0 \\ 0 & 0 & \tilde{v}_1 & 0 \\ 0 & 0 & 0 & \tilde{v}_2 \end{pmatrix} \cdot \begin{pmatrix} r_1(l) \\ r_1^*(l+1) \\ r_2(l) \\ r_2^*(l+1) \end{pmatrix} \quad (8A)$$

$$\vec{\tilde{r}}_{1-4} = \tilde{V}_{12} \cdot \vec{r}_{1-4} \quad (8B)$$

$$\begin{pmatrix} \tilde{r}_1(l+2) \\ \tilde{r}_1^*(l+3) \\ \tilde{r}_2(l+2) \\ \tilde{r}_2^*(l+3) \end{pmatrix} = \begin{pmatrix} \tilde{v}_3 & 0 & 0 & 0 \\ 0 & \tilde{v}_4 & 0 & 0 \\ 0 & 0 & \tilde{v}_3 & 0 \\ 0 & 0 & 0 & \tilde{v}_4 \end{pmatrix} \cdot \begin{pmatrix} r_1(l+2) \\ r_1^*(l+3) \\ r_2(l+2) \\ r_2^*(l+3) \end{pmatrix} \quad (9A)$$

$$\vec{\tilde{r}}_{5-8} = \tilde{V}_{34} \cdot \vec{r}_{5-8} \quad (9B)$$

The channel-decoded hypotheses $\vec{\tilde{r}}_{1-4}$ and respectively $\vec{\tilde{r}}_{5-8}$ for the received OFDM data symbols $\vec{r}_{1-4}$ and $\vec{r}_{5-8}$, channel-decoded according to equations (8A) and (8B) and equations (9A) and (9B) from the weighting of the received data symbols $\vec{r}_{1-4}$ and respectively $\vec{r}_{5-8}$ with the hypotheses $\tilde{v}_1, \tilde{v}_2, \tilde{v}_3, \tilde{v}_4$ for the unknown coefficients $v_1, v_2, v_3, v_4$, are equalised in the case of estimated values $\hat{h}_{n1}, \hat{h}_{n2}, \hat{h}_{n3}, \hat{h}_{n4}$ for the transmission factors $h_{n1}, h_{n2}, h_{n3}, h_{n4}$, known with regard to the modulus but unknown with regard to the sign, of the partial channels extending from the four transmission antennas 1,2,3,4 to the respectively n reception antennas, in each case according to equation (10) and (11) with the hypothesis matrices $\tilde{H}_{1-4}$ and respectively $\tilde{H}_{5-8}$ for the channel transmission matrices $H_{1-4}$ and respectively $H_{5-8}$, in order to determine hypotheses $\vec{\tilde{S}}_{1-4}$ and respectively $\vec{\tilde{S}}_{5-8}$ for the transmitted OFDM symbols $\vec{S}_{1-4}$ and $\vec{S}_{5-8}$. The hypothesis matrices $\tilde{H}_{1-4}$ and respectively $\tilde{H}_{5-8}$ each contain hypotheses $\tilde{h}_{n1}, \tilde{h}_{n2}, \tilde{h}_{n3}, \tilde{h}_{n4}$ for the transmission factors $h_{n1}, h_{n2}, h_{n3}, h_{n4}$ in the partial channels between the four transmission antennas and the $n=1, \ldots, N_R$ reception antennas, wherein $N_R$ is the number of reception antennas. Accordingly, the two values $+\hat{h}_{nm}$ and $-\hat{h}_{nm}$ are selected for the hypotheses $\tilde{h}_{n1}, \tilde{h}_{n2}, \tilde{h}_{n3}, \tilde{h}_{n4}$ for the transmission factors $h_{n1}, h_{n2}, h_{n3}, h_{n4}$ on the basis of the knowledge of the modulus of the respective transmission factor and on the basis of the uncertainty about the sign of the estimate of the respective transmission factor, wherein $\hat{h}_{nm}$ is the known modulus of the estimated value of the respective transmission factor. Conversely, since the estimated transmission factors $\hat{h}_{nm}$ assume $\hat{h}_{nm} = \pm \hat{h}_{nm}$ in view of the uncertainty in the channel estimation, $$\tilde{h}_{nm} = \pm \hat{h}_{nm} \text{ or } \frac{\tilde{h}_{nm}}{\hat{h}_{nm}} = \pm 1$$

applies for the hypothesis $\tilde{h}_{nm}$ of the respective transmission factor, taking into consideration $\tilde{h}_{nm} = \pm \hat{h}_{nm}$.

$$\vec{\tilde{s}}_{1-4} = \tilde{H}_{1-4}^{-1} \cdot \vec{\tilde{r}}_{1-4} \quad (10)$$

$$\vec{\tilde{s}}_{1-4} = \tilde{H}_{5-8}^{-1} \cdot \vec{\tilde{r}}_{5-8} \quad (11)$$

If the mathematical relationships for the channel-decoded hypotheses $\vec{\tilde{r}}_{1-4}$ and respectively $\vec{\tilde{r}}_{5-8}$ for the received OFDM data symbols $\vec{r}_{1-4}$ and $\vec{r}_{5-8}$ from equations (8B) and (9B) and the mathematical relationships for the received data symbols $\vec{r}_{1-4}$ and respectively $\vec{r}_{5-8}$ from equations (5B) and (6B) are inserted into equation (10) and respectively (11), equations (12) and respectively (13) are obtained.

$$\vec{\tilde{s}}_{1-4} = \tilde{H}_{1-4}^{-1} \cdot \tilde{V}_{12} \cdot \vec{r}_{1-4} = \tilde{H}_{1-4}^{-1} \cdot \tilde{V}_{12} \cdot V_{12} \cdot H_{1-4} \cdot \vec{s}_{1-4} \quad (10)$$

$$\vec{\tilde{s}}_{5-8} = \tilde{H}_{5-8}^{-1} \cdot \tilde{V}_{34} \cdot \vec{r}_{5-8} = \tilde{H}_{5-8}^{-1} \cdot \tilde{V}_{34} \cdot V_{34} \cdot H_{5-8} \cdot \vec{s}_{5-8} \quad (11)$$

If the hypotheses $\tilde{v}_i$ for the coefficients $v_i$ agree with the actual coefficients $v_i$, and the hypotheses $\tilde{h}_{nm}$ for the transmission factors $h_{nm}$ agree with the actual transmission factors $h_{nm}$ then the hypotheses $\vec{\tilde{s}}_{1-4}$ and respectively $\vec{\tilde{s}}_{5-8}$ for the transmitted OFDM data symbols $\vec{s}_{1-4}$ and $\vec{s}_{5-8}$ according to equation (12) and respectively (13) agree with the actually transmitted OFDM data symbols $\vec{s}_{1-4}$ and respectively $\vec{s}_{5-8}$ and form the estimated values $\vec{\hat{s}}_{1-4}$ and $\vec{\hat{s}}_{5-8}$ for the transmitted OFDM data symbols $\vec{s}_{1-4}$ and respectively $\vec{s}_{5-8}$.

$$\vec{\tilde{s}}_{1-4} = \underbrace{H_{1-4}^{-1} \cdot \tilde{V}_{12} \cdot V_{12}}_{=1} \cdot H_{1-4} \cdot \vec{s}_{1-4} = \vec{s}_{1-4} = \vec{\hat{s}}_{1-4} \quad (12)$$

$$\vec{\tilde{s}}_{5-8} = \underbrace{H_{5-8}^{-1} \cdot \tilde{V}_{34} \cdot V_{34}}_{=1} \cdot H_{5-8} \cdot \vec{s}_{5-8} = \vec{s}_{5-8} = \vec{\hat{s}}_{5-8} \quad (13)$$

If every hypothesis $\tilde{v}_i$ for the coefficients $v_i$ and every hypothesis $\tilde{h}_{nm}$ for the transmission factor $h_{nm}$ is combined with one another, a total of 64 hypothesis combinations are obtained. The decoding of the received OFDM data symbols $\vec{r}_{1-4}$ and respectively $\vec{r}_{5-8}$ according to equation (10) and respectively (11) in order to obtain the associated hypotheses $\vec{\tilde{s}}_{1-4}$ and $\vec{\tilde{s}}_{5-8}$ for the transmitted OFDM data symbols $\vec{s}_{1-4}$ and $\vec{s}_{5-8}$ is implemented separately with every individual hypothesis combination from the total of 64 hypothesis combinations. If the decoding is implemented with all 64 hypothesis combinations, the decoding results presented in the table in FIG. 5 are obtained.

The table in FIG. 5 presents all possible hypothesis combinations on the left-hand side and, on the right-hand side, the hypotheses $\vec{\tilde{s}}_{1-4}$ and respectively $\vec{\tilde{s}}_{5-8}$ determined by means of equations (12) and (13) for the transmitted OFDM data symbols $\vec{s}_{1-4}$ and $\vec{s}_{5-8}$ as a function for the transmitted OFDM data symbols $\vec{s}_{1-4}$ and respectively $\vec{s}_{5-8}$.

Accordingly, only those right-hand table elements contain a value at which a singular and linear dependence between the respective hypothesis $\tilde{s}_i$ of the transmitted OFDM symbol $s_i$ and the associated, actually transmitted OFDM symbol $s_i$ exists, which can differ only with regard to the sign. In all other cases, in which the respective table element is blank, the respective hypotheses $\tilde{s}_i$ of the transmitted OFDM symbol $s_i$ provides a more complex functional connection with one or more transmitted OFDM symbol $s_i$. While, in the first case, the respective hypothesis $\tilde{s}_i$ of the transmitted OFDM symbol $s_i$ coincides with an OFDM data symbol of the symbol alphabet used in the constellation diagram, which can differ from the actually transmitted OFDM symbol $s_i$ only with regard to the sign, in the second case, the respective hypothesis $\tilde{s}_i$ of the transmitted OFDM symbol $s_i$ does not come to be disposed on any OFDM data symbol of the symbol alphabet used in the constellation diagram and is therefore excluded as a hypothesis combination which can be used for the decoding.

Additionally, it must be established that, with a value of −1 for the product $\tilde{v}_1 \cdot v_1$ of the hypothesis $\tilde{v}_1$ for the coefficient $v_1$ and the actual coefficient $v_1$ and at the same time with a value of +1 for the product $\tilde{v}_2 \cdot v_2$ of the hypothesis $\tilde{v}_2$ for the coefficient $v_2$ and the actual coefficient $v_2$ for the hypothesis $\tilde{s}_i$ of the transmitted OFDM symbol $s_i$, the associated transmitted OFDM data symbol $\pm s_i$, which is identical with regard to modulus and differs possibly only with regard to sign, is determined as in the case of a value of +1 for the product $\tilde{v}_1 \cdot v_1$ of the hypothesis $\tilde{v}_1$ for the coefficient $v_l$ and the actual coefficient $v_l$ and at the same time with a value of −1 for the product $\tilde{v}_2 \cdot v_2$ of the hypothesis $\tilde{v}_2$ for the coefficient $v_2$ and the actual coefficient $v_2$.

Moreover, it must be established that with a value of −1 for the product $\tilde{v}_v \cdot v_1$ of the hypothesis $\tilde{v}_1$ for the coefficient $v_1$ and the actual coefficient $v_1$ and at the same time with a value of −1 for the product $\tilde{v}_2 \cdot v_2$ of the hypothesis $\tilde{v}_2$ for the coefficient $v_2$ and the actual coefficient $v_2$ for the hypothesis $\tilde{s}_i$ of the transmitted OFDM symbol $s_i$, the same transmitted OFDM data symbol $\pm s_i$, which is identical with regard to modulus and differs possibly only with regard to sign, is determined as with a value of +1 for the product $\tilde{v}_1 \cdot v_1$ of the hypothesis $\tilde{v}_1$ for the coefficient $v_1$ and the actual coefficient $v_1$ and at the same time with a value of +1 for the product $\tilde{v}_2 \cdot v_2$ of the hypothesis $\tilde{v}_2$ for the coefficient $v_2$ and the actual coefficient $v_2$. The same results are obtained for the product $\tilde{v}_3 \cdot v_3$ of the hypothesis $\tilde{v}_3$ for the coefficient $v_3$ and the actual coefficient $v_3$ and for the product $\tilde{v}_4 \cdot v_4$ of the hypothesis $\tilde{v}_4$ for the coefficient $v_4$ and the actual coefficient $v_4$.

Since the sign of the decoded OFDM data symbol $\hat{s}_i$ is not relevant in the case of an amplitude-orientated analysis of the transmitted OFDM data symbols, in a first embodiment of the invention, the number of hypothesis combinations can be reduced from originally 64 hypothesis combinations to 32 hypothesis combinations by investigating respectively either only the value +1 or only the value −1 for the product $\tilde{v}_1 \cdot v_1$ and the product $\tilde{v}_3 \cdot v_3$, as shown in the table in FIG. 5, while the values +1 and −1 are investigated for the products $\tilde{v}_2 \cdot v_2$ and $\tilde{v}_4 \cdot v_4$ in each case.

For the hypothesis combinations with an even hypothesis-combination number in the table in FIG. 5—in the table in FIG. 5, the hypothesis-combination numbers with grey shading—the values with grey shading for the products $\tilde{v}_2 \cdot v_2$ and respectively $\tilde{v}_4 \cdot v_4$ and the assignment with grey shading of the transmitted data symbols $s_i$ to the hypotheses $\tilde{s}_i$ of the transmitted OFDM symbols $s_i$ apply in each case.

As is evident from the table in FIG. 5, for every vector $\tilde{s}_{1\_4}$ and respectively $\tilde{s}_{5\_8}$ from each of four transmitted OFDM data symbols, in each case 8 hypothesis combinations $\vec{\tilde{s}}_{1-4}$ and respectively $\vec{\tilde{s}}_{5-8}$ for the transmitted OFDM data symbols $\vec{s}_{1-4}$ and $\vec{s}_{5-8}$ which lead to OFDM data symbols of the symbol alphabet used in the constellation diagram are obtained. Because of the uncertainty regarding the sign of the individual hypotheses si for each transmitted OFDM data symbol $s_i$, it is not possible to infer the originally transmitted and correctly signed OFDM data symbol $s_i$ from the individual hypotheses. However, this is not relevant for purely amplitude-orientated analysis of the transmitted OFDM data symbols $s_i$, for example, for a measurement of the amplitude of the error vector (Error Vector Magnitude (EVM)) of the IQ offset of the transmitted OFDM data symbol.

In order to identify one of the 8 correct hypothesis combinations, according to equations (14A) and respectively (14B),
a metric is calculated in each case, which determines the Euclidian distance between the determined hypotheses $\tilde{s}_i$ for every transmitted OFDM data symbol $s_i$ and the associated OFDM data symbol $d_i$ of the symbol alphabet used which is disposed nearest in the constellation diagram.

$$\text{Metric} = \sum_{i=1}^{4} |\tilde{s}_i - d_i| \quad (14A)$$

$$\text{Metric} = \sum_{i=5}^{8} |\tilde{s}_i - d_i| \quad (14B)$$

As an alternative, the metric according to equation (15) can be calculated separately for every OFDM data symbol $s_i$ as the Euclidian distance between the hypothesis $\tilde{s}_i$ determined for each transmitted OFDM data symbol $s_i$ and the associated data symbol $d_i$ of the symbol alphabet used which is disposed nearest in the constellation diagram.

$$\text{Metric} = |\tilde{s}_i - d_i| \forall i = 1, \ldots, 8 \quad (15)$$

To achieve an additional reduction in the number of hypothesis combinations to be calculated, it is necessary, through skilled selection of the individual hypotheses $\tilde{h}_{nm}$ for the respective transmission factor $h_{nm}$ which is not known to the receiver, to find at least one of the 8 hypothesis combinations, which, in each case, in the table in FIG. 5, represents a hypothesis combination $\vec{\tilde{s}}_{1-4}$ and $\vec{\tilde{s}}_{5-8}$ for the two vectors $\vec{s}_{1-4}$ and respectively $\vec{s}_{5-8}$ of the transmitted OFDM data symbols with valid OFDM data symbols of the symbol alphabet (lines 1, 4, 6, 7, 10, 11, 13 and 16 in the table in FIG. 5).

From the table in FIG. 5, it is evident that these are precisely the lines, in which all of the hypotheses $$\frac{\tilde{h}_{nm}}{h_{nm}}$$

scaled to the actual transmission factor each provide a value +1 or respectively a value −1, or respectively, two scaled hypotheses $$\frac{\tilde{h}_{nm}}{h_{nm}}$$

each provide a value +1 and respectively two scaled hypotheses $$\frac{\tilde{h}_{nm}}{h_{nm}}$$

each provide a value −1. Consequently, for all value combinations of the actual transmission factors, corresponding hypotheses $\tilde{h}_{nm}$ for the individual transmission factors $h_{nm}$ must be selected, so that at least one of these 8 hypothesis combinations of the scaled hypotheses $$\frac{\tilde{h}_{nm}}{h_{nm}}$$

is obtained which, for every transmitted OFDM data symbol $s_i$, leads to a hypothesis $\tilde{s}_i$, which, ignoring the sign of the hypothesis $\tilde{s}_i$, leads to an OFDM symbol of the symbol alphabet used.

It is simplest if the ratios of the estimated to the actual transmission factors are either all positive (that is $\hat{h}_{nm}=+h_{nm}$) or all negative (that is $\hat{h}_{nm}=-h_{nm}$), or two ratios are positive in each case (that is $\hat{h}_{nm}=+h_{nm}$) and two ratios are negative in each case (that is $\hat{h}_{nm}=-h_{nm}$). Accordingly, in each case, a positive estimated value $+\hat{h}_{nm}$ for the transmission factor $h_{nm}$ is assigned to the hypothesis $\tilde{h}_{nm}$ for each of the transmission factors (see lines 1 and 2 in the table in FIG. 6) and the associated scaled hypotheses $$\frac{\tilde{h}_{nm}}{h_{nm}}$$

are obtained as $$\frac{\tilde{h}_{nm}}{h_{nm}} = \frac{+\hat{h}_{nm}}{h_{nm}}.$$

If the ratio of the estimated transmission factor to the actual transmission factor is a positive value $\hat{h}_{nm}=+h_{nm}$, a value of +1 is obtained for the associated scaled hypothesis $$\frac{\tilde{h}_{nm}}{h_{nm}},$$

and, if the ratio is a negative value $\hat{h}_{nm}=-h_{nm}$, a value of −1 is obtained for the associated scaled hypothesis $$\frac{\tilde{h}_{nm}}{h_{nm}}.$$

The signs of the ratios of the estimated transmission factors and the actual transmission factors are consequently retained in the signs of the associated scaled hypotheses $$\frac{\tilde{h}_{nm}}{h_{nm}},$$

and therefore lead to one of the 8 hypothesis combinations in the table in FIG. 5 which can be assigned to an OFDM symbol of the symbol alphabet used.

In all other cases, if only a single ratio is positive (that is $\hat{h}_{nm}=+h_{nm}$) and the other three ratios are each negative (that is $\hat{h}_{nm}=-h_{nm}$), or only a single ratio is negative (that is $\hat{h}_{nm}=-h_{nm}$) and the other three ratios are each positive (that is $\hat{h}_{nm}=+h_{nm}$), in each case, a negative estimated value $-\hat{h}_{nm}$ for the transmission factor $h_{nm}$ is assigned to the hypothesis $\tilde{h}_{nm}$ for a single transmission factor $h_{nm}$, and in each case, a positive estimated value $+\hat{h}_{nm}$ for the transmission factor $h_{nm}$ is assigned to the hypotheses $\tilde{h}_{nm}$ for the other three transmission factors $h_{nm}$ (see lines 3 to 10 in the table in FIG. 6).

If the hypothesis $\tilde{h}_{nm}$ for the transmission factor $h_{nm}$, to which a negative estimated value $-\hat{h}_{nm}$ for the transmission factor $h_{nm}$ is assigned, coincides with an estimated value with a negative ratio (that is $\hat{h}_{nm}=-h_{nm}$), a value of +1 is obtained for the associated scaled hypothesis $$\frac{\tilde{h}_{nm}}{h_{nm}} = \frac{-\hat{h}_{nm}}{h_{nm}} = \frac{-(-h_{nm})}{h_{nm}} = +1,$$

while, for the other actual transmission factors $h_{nm}$ of which the ratios are accordingly positive (that is $\hat{h}_{nm}=+h_{nm}$), a hypothesis $\tilde{h}_{nm}$ with a positive estimated value $+\hat{h}_{nm}$ is assigned, which leads to a scaled hypothesis $$\frac{\tilde{h}_{nm}}{h_{nm}} = \frac{+\hat{h}_{nm}}{h_{nm}} = \frac{+|h_{nm}|}{h_{nm}} = +1.$$

Accordingly, through this assignment of the hypothesis $\tilde{h}_{nm}$, one of the total of 8 hypothesis combinations in the table in FIG. 5 is generated "artificially", which can be assigned to an OFDM symbol of the symbol alphabet used (accurately, the hypothesis combination in line 1 of the table in FIG. 5 is generated).

By contrast, if the hypothesis $\tilde{h}_{nm}$ for the transmission factor $h_{nm}$ to which a negative estimated value $-\hat{h}_{nm}$ for the transmission factor $h_{nm}$ is assigned, coincides with a positive ratio (that is $\hat{h}_{nm}=+h_{nm}$), a value of −1 is obtained for the associated scaled hypothesis $$\frac{\tilde{h}_{nm}}{h_{nm}} = \frac{-\hat{h}_{nm}}{h_{nm}} = \frac{-h_{nm}}{h_{nm}} = -1,$$

while, for the other actual transmission factors $h_{nm}$ a hypothesis $\tilde{h}_{nm}$ with a positive estimated value $+\hat{h}_{nm}$ is assigned. For the two actual transmission factors $h_{nm}$, of which the ratios are positive (that is $\hat{h}_{nm}=+h_{nm}$), the scaled hypothesis $$\frac{\tilde{h}_{nm}}{h_{nm}} = \frac{+\hat{h}_{nm}}{h_{nm}} = \frac{h_{nm}}{h_{nm}} = +1$$

with the value +1 is obtained, while, for the single actual transmission factor $h_m$ of which the ratio is negative (that is $\hat{h}_{nm}=-h_{nm}$), the scaled hypothesis $$\frac{\tilde{h}_{nm}}{h_{nm}} = \frac{+\hat{h}_{nm}}{-|h_{nm}|} = \frac{+|h_{nm}|}{-|h_{nm}|} = -1$$

with a value −1 is obtained.

Accordingly, through this assignment of the hypothesis $\tilde{h}_{nm}$, one of the total of 8 hypothesis combinations in the table in FIG. 5 is generated "artificially", which can be assigned to an OFDM symbol of the symbol alphabet used (accurately, one of the hypothesis combinations in lines 4, 6, 7, 10, 11, and 13 in the table in FIG. 5 is generated).

In the second embodiment of the invention, as with the first embodiment of the invention in the table in FIG. 5, the values +1 and −1 must be assigned in each case for the hypotheses $\tilde{v}_2$ and respectively $\tilde{v}_4$ of the coefficients $v_2$ and $v_4$, and the value +1 must be assigned for the hypotheses $\tilde{v}_1$ and respectively $\tilde{v}_3$ of the coefficients $v_1$ and $v_3$, so that, in the second embodiment of the invention according to the table in FIG. 6, only 10 hypothesis combinations must be checked.

Figure 7:
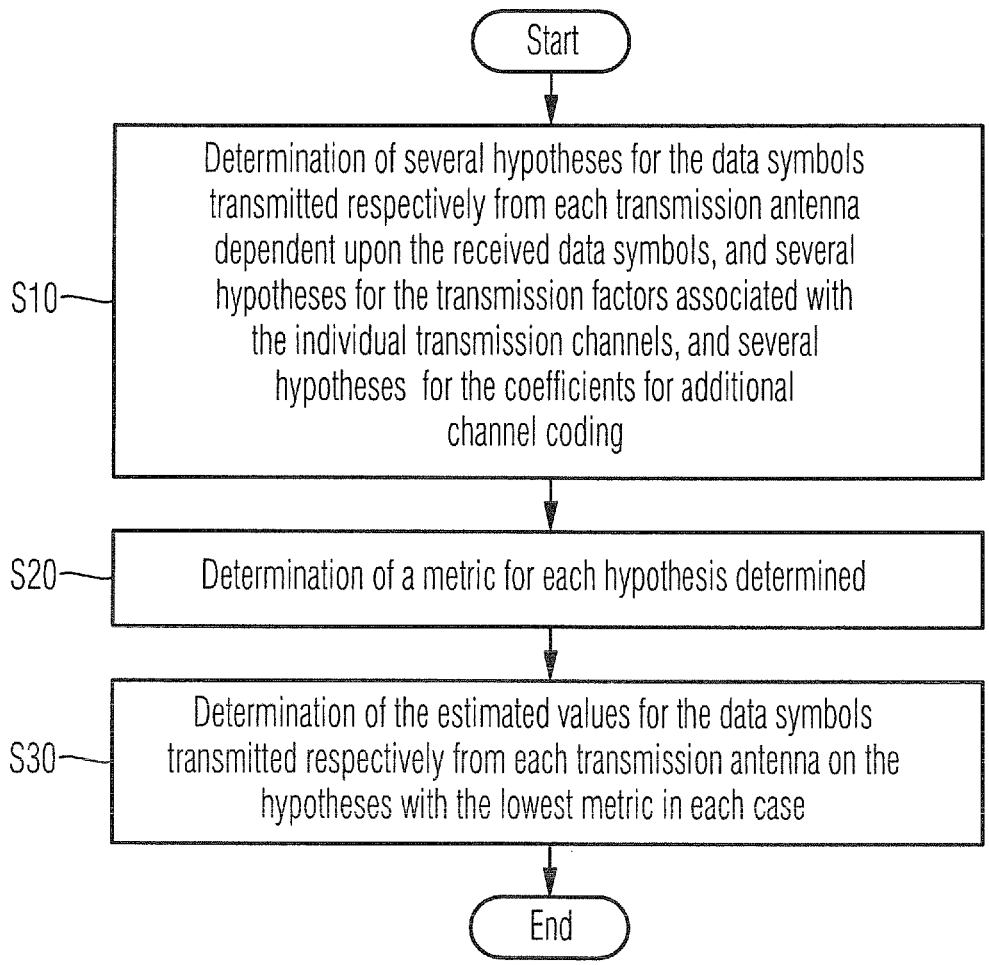
FIG. 7 shows a flow chart of the method according to the invention for determining estimated values for data symbols transmitted from each of four transmission antennas of a MIMO-OFDM transmission system.

In the following section, the method according to the invention for determining estimated values for data symbols transmitted in each case from four transmission antennas of a MIMO-OFDM transmission system is explained with reference to the flow chart in FIG. 7.

In the first method step S10, hypotheses $\tilde{\vec{s}}_{1-4}$ and respectively $\tilde{\vec{s}}_{5-8}$ for the OFDM data symbols e,rar $s_{1-4}$ and $\vec{s}_{5-8}$ transmitted at each OFDM symbol timing point l,l+1, l+2,l+3, ... are calculated by the receiver according to equations (10) and respectively (11) at every OFDM symbol timing point, starting from the OFDM symbols $\vec{r}_{1-4}$ and respectively $\vec{r}_{5-8}$ received by the two reception antennas in each case at the respective OFDM symbol timing point l,l+1,l+2, l+3, ... In this context, hypotheses $\tilde{v}_1$, $\tilde{v}_2$, $\tilde{v}_3$, $\tilde{v}_4$ for the unknown coefficients $v_1$, $v_2$, $v_3$, $v_4$ for the additional channel coding of the transmitted OFDM data symbols $\vec{s}_{1-4}$ and respectively $\vec{s}_{1-4}$ within the framework of the "Matrix B" coding, and hypotheses $\tilde{h}_{n1},\tilde{h}_{n2},\tilde{h}_{n3},\tilde{h}_{n4}$ for the transmission factors $h_{n1},h_{n2},h_{n3},h_{n4}$ of the individual partial channels between the four transmission antennas m and the at least two reception antennas n in the framework of the total of 32 hypothesis combinations of the first embodiment of the invention in table in FIG. 5 or within the framework of the only 10 hypothesis combinations of the second embodiment of the invention in the table in FIG. 6 are selected respectively.

In the next method step S20, a metric is calculated for each of the 32 or respectively 10 hypothesis combinations. In a first variant, according to equations (14A) and respectively (14B), the metric is determined as a summated Euclidian distance between the hypotheses $\tilde{s}_i$ of respectively four transmitted OFDM data symbols $s_i$ and the associated OFDM data symbols of the symbol alphabet used which are disposed nearest in the constellation diagram. In a second variant, according to equation (15), the metric is determined separately for every transmitted OFDM data symbol $s_i$ as the Euclidian distance between the hypothesis $\tilde{s}_i$ of the respective transmitted OFDM data symbol $s_i$ and of the associated OFDM data symbol of the symbol alphabet used which is disposed nearest in the constellation diagram. In this context, it is sufficient that the metric is implemented according to equation (15) only for one of the four transmitted data symbols $s_1$ to $s_4$ and only for one of the four transmitted data symbols $s_5$ to $s_8$. This has the advantage that the cost for the calculation of the metric(s) is reduced to a quarter, while the robustness of the metric is disadvantageously reduced.

In the last method step S30, the hypothesis $\tilde{s}_i$ of the transmitted OFDM data symbols $s_i$ is finally selected as an estimated value $\hat{s}_i$ of the transmitted OFDM data symbol $s_i$, which provides the lowest metric in each case. Accurately, only one of the 8 hypothesis combinations of the table in FIG. 5 which is associated with OFDM data symbols of the symbol alphabet used needs to be identified.

The invention is not restricted to the embodiments and variants of the invention presented. In particular, MIMO-OFDM transmission systems with more than two reception antennas are also covered by the invention.

The invention claimed is:

1. A method for determining estimated values ($\hat{\vec{s}}_{1-4}$, $\hat{\vec{s}}_{5-8}$) for data symbols ($\vec{s}_{1-4}$, $\vec{s}_{5-8}$) transmitted from at least four transmission antennas of a MIMO transmission system, which are encoded according to the Matrix B transmission mode and weighted with coefficients ($v_i$), the method comprising:

receiving data symbols ($\vec{r}_{1-4}$, $\vec{r}_{5-8}$) at at least two reception antennas, determining hypotheses ($\tilde{\vec{s}}_{1-4}$, $\tilde{\vec{s}}_{5-8}$) for the transmitted data symbols ($\vec{s}_{1-4}$, $\vec{s}_{5-8}$) from the received data symbols ($\vec{r}_{1-4}$, $\vec{r}_{5-8}$) received from each of the at least two reception antennas, which are weighted in each case with hypotheses ($\tilde{h}_{nm}$) for the transmission factors ($h_{nm}$) associated with a partial transmission channel, in each case between a transmission antenna m and a reception antenna n, and with hypotheses ($\tilde{v}_i$) for the coefficients ($v_i$), determining a metric for each hypothesis ($\tilde{\vec{s}}_{1-4}$, $\tilde{\vec{s}}_{5-8}$) associated in each case with at least one transmitted data symbol ($\vec{s}_{1-4}$, $\vec{s}_{5-8}$), and determining the estimated value ($\hat{\vec{s}}_{1-4}$, $\hat{\vec{s}}_{5-8}$) for the respective, transmitted data symbol ($\vec{s}_{1-4}$, $\vec{s}_{5-8}$) from the lowest metric associated with each hypothesis ($\hat{\vec{s}}_{1-4}$, $\hat{\vec{s}}_{5-8}$).

2. The method according to claim 1, wherein the metric is formed as a Euclidian distance between a hypothesis ($\tilde{\vec{s}}_{1-4}$, $\tilde{\vec{s}}_{5-8}$) associated in each case with at least one transmitted data symbol ($\vec{s}_{1-4}$, $\vec{s}_{5-8}$) and the associated data symbol ($d_i$) of the symbol alphabet disposed nearest in the constellation diagram.

3. The method according to claim 1, wherein a metric is calculated separately for each data symbol transmitted from each transmission antenna at a symbol timing point.

4. The method according to claim 3, wherein only one, two or three of the four transmitted data symbols ($\vec{s}_{1-4}$ $\vec{s}_{5-8}$) is/are estimated by means of a metric.

5. The method according to claim 1, wherein a common metric is calculated for the data symbols ($\vec{s}_{1-4}$, $\vec{s}_{5-8}$) transmitted respectively by all transmission antennas at one OFDM symbol timing point.

6. The method according to claim 1, wherein the respective positive and negative value (+$h_{nm}$,−$h_{nm}$) of the transmission factor ($h_{nm}$) determinable without sign are permitted for the hypotheses ($\tilde{h}_{nm}$) of the transmission factors ($h_{nm}$) associated with each of the individual transmission channels, wherein the transmission factors ($h_{nm}$) of the transmission channels which originate from a common transmission antenna are identical with regard to sign.

7. The method according to claim 1, wherein in each case the values +1 and −1 are permitted for the coefficients ($v_i$) and accordingly for the hypotheses ($\tilde{v}_i$) set up for the individual coefficients ($v_i$).

8. The method according to claim 7, wherein only the value +1 or only the value −1 is provided for each of the hypotheses ($\tilde{v}_i$) for the coefficients ($v_i$) for the weighting of every second transmitted data symbol ($\vec{s}_{1-4}$, $\vec{s}_{5-8}$).

9. The method according to claim 8,
wherein either a positive value of the associated, determinable transmission factor ($h_{nm}$) is provided for the hypotheses ($\tilde{h}_{nm}$) of all of the transmission factors ($h_{nm}$) associated with each of the individual partial transmission channels, or respectively, a negative value of the associated, determinable transmission factor ($h_{nm}$) must be provided only for the hypothesis ($\tilde{h}_{nm}$) of an individual one of the transmission factors ($h_{nm}$) associated in each case with the individual partial transmission channels.

10. The method according to claim 6,
wherein the hypotheses ($\tilde{h}_{nm}$) for the transmission factors ($h_{nm}$) associated with each of the individual partial transmission channels only need to be determined individually on one sub-carrier and only at one OFDM symbol timing point of the respective partial transmission channel.

11. A device for determining estimated values ($\hat{\vec{s}}_{1-4}$, $\hat{\vec{s}}_{5-8}$) for data symbols ($\vec{s}_{1-4}$, $\vec{s}_{5-8}$) transmitted from each of at least four transmission antennas of a MIMO transmission system, which are encoded according to the Matrix B transmission mode and weighted with coefficients ($v_i$) with a processor, which implements a method for determining estimated values according to claim 1.

12. A non-transitory digital storage medium with electronically readable control signals, which can cooperate in such a manner with a programmable computer or digital signal processor that a method according claim 1 is implemented.

13. A computer program stored on a non-transitory recording medium with program code means for the execution of a method according to claim 1, when the computer program is executed in a computer or a digital signal processor.

14. The method according to claim 2,
wherein a metric is calculated separately for each data symbol transmitted from each transmission antenna at a symbol timing point.

15. The method according to claim 14,
wherein only one, two or three of the four transmitted data symbols ($\vec{s}_{1-4}$, $\vec{s}_{5-8}$) is are estimated by means of a metric.

16. The method according to claim 2,
wherein a common metric is calculated for the data symbols ($\vec{s}_{1-4}$, $\vec{s}_{5-8}$) transmitted respectively by all transmission antennas at one OFDM symbol timing point.

17. The method according to claim 2,
wherein the respective positive and negative value ($+h_{nm}$, $-h_{nm}$) of the transmission factor ($h_{nm}$) determinable without sign are permitted for the hypotheses ($\tilde{h}_{nm}$) of the transmission factors ($h_{nm}$) associated with each of the individual transmission channels, wherein the transmission factors ($h_{nm}$) of the transmission channels which originate from a common transmission antenna are identical with regard to sign.

18. The method according to claim 2,
wherein in each case the values +1 and −1 are permitted for the coefficients ($v_i$) and accordingly for the hypotheses ($\tilde{v}_i$) set up for the individual coefficients ($v_i$).

19. The method according to claim 18,
wherein only the value +1 or only the value −1 is provided for each of the hypotheses ($\tilde{v}_i$) for the coefficients ($v_i$) for the weighting of every second transmitted data symbol ($\vec{s}_{1-4}$, $\vec{s}_{5-8}$).

20. The method according to claim 19,
wherein either a positive value of the associated, determinable transmission factor ($h_{nm}$) is provided for the hypotheses ($\tilde{h}_{nm}$) of all of the transmission factors ($h_{nm}$) associated with each of the individual partial transmission channels, or respectively, a negative value of the associated, determinable transmission factor ($h_{nm}$) must be provided only for the hypothesis ($\tilde{h}_{nm}$) of an individual one of the transmission factors ($h_{nm}$) associated in each case with the individual partial transmission channels.

* * * * *